United States Patent
Lo et al.

(10) Patent No.: US 10,157,257 B2
(45) Date of Patent: Dec. 18, 2018

(54) METHOD FOR ANALYZING AN ELECTROMIGRATION (EM) RULE VIOLATION IN AN INTEGRATED CIRCUIT

(71) Applicant: Taiwan Semiconductor Manufacturing Company Limited, Hsinchu (TW)

(72) Inventors: Wan-Yu Lo, Taoyuan County (TW); Chung-Hsing Wang, Hsinchu County (TW); Chin-Shen Lin, Taipei (TW); Kuo-Nan Yang, Hsinchu (TW)

(73) Assignee: Taiwan Semiconductor Manufacturing Company Limited, Hsinchu (TW)

(*) Notice: Subject to any disclaimer, the term of this patent is extended or adjusted under 35 U.S.C. 154(b) by 0 days.

(21) Appl. No.: 15/272,457

(22) Filed: Sep. 22, 2016

(65) Prior Publication Data

US 2018/0082010 A1  Mar. 22, 2018

(51) Int. Cl.
*G06F 17/50* (2006.01)

(52) U.S. Cl.
CPC ...... *G06F 17/5081* (2013.01); *G06F 2217/12* (2013.01)

(58) Field of Classification Search
CPC ............. G06F 17/5077; G06F 17/5081; G06F 17/5036; G06F 17/5068; G06F 17/5009; G06F 2217/78; G06F 17/50; G06F 17/5018; G06F 17/5022; G06F 17/5045; G06F 17/509; G06F 2217/12; G06F 2217/80; G01R 27/205; G03F 1/03
USPC .................................................. 716/110–116
See application file for complete search history.

(56) References Cited

U.S. PATENT DOCUMENTS

| | | | |
|---|---|---|---|
| 2008/0086709 A1* | 4/2008 | Rittman | G06F 17/5081 716/52 |
| 2009/0031264 A1* | 1/2009 | Rittman | G06F 17/5081 716/106 |
| 2012/0110530 A1* | 5/2012 | Yang | G06F 17/5068 716/112 |
| 2013/0055184 A1* | 2/2013 | Shroff | G06F 17/5081 716/112 |
| 2015/0095873 A1* | 4/2015 | Lin | G06F 17/5045 716/136 |

* cited by examiner

*Primary Examiner* — Binh Tat
(74) *Attorney, Agent, or Firm* — Jones Day (57) ABSTRACT

A method includes receiving an input that is in an electronic file format and that includes information associated with an integrated circuit (IC) layout, selecting a non EM rule compliant metal line of the IC layout that is in violation of an EM rule from the input, obtaining a current of the non EM rule compliant metal line from the input, comparing the current with a threshold current, and determining whether the EM rule violation is negligible based on the result of comparison. As such, a semiconductor device may be fabricated from the IC layout when it is determined that the EM rule violation is negligible.

17 Claims, 6 Drawing Sheets

METHOD FOR ANALYZING AN ELECTROMIGRATION (EM) RULE VIOLATION IN AN INTEGRATED CIRCUIT

BACKGROUND

A conventional semiconductor device includes a substrate, a circuit that is above the substrate, and metal lines that interconnect components of the circuit and that comply with electromigration (EM) rules.

EM is a phenomenon in which ions/atoms of a metal line of a semiconductor device migrate from a first region to a second region of the metal line and involves formation of voids at the first region of the metal line, which may cause an open circuit in the semiconductor device, and accumulation of the ions/atoms at the second region of the metal line, which may cause a short circuit in the semiconductor device. EM rules are established limiting a current flowing through a metal line at an allowable EM.

Prior to fabrication of the semiconductor device from an integrated circuit (IC) layout, an EM analysis is performed on the IC layout in order to detect whether the metal lines are in compliance with or in violation of an EM rule. Only when each of the metal lines is detected to be EM rule compliant will the fabrication of the semiconductor device start.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The present disclosure provides exemplary system/method for analyzing an electromigration (EM) rule violation. In particular, the system/method determines whether an EM rule violation detected in an integrated circuit (IC) layout is negligible. In an event where it is determined that the EM rule violation is negligible, fabrication of a semiconductor device from the IC layout may be started/performed without delay, i.e., without the need to modify the IC layout/fix the EM rule violation.

As will be described hereafter, the present disclosure is based on a concept that an EM lifetime of a semiconductor device is a function of a current density of a metal line of the semiconductor device. That is, even if the metal line does not comply with, i.e., violates, an EM rule, e.g., a root-mean-square (RMS) current that flows through the metal line exceeds a threshold RMS current, when a direct current (DC) of the metal line does not exceed a threshold DC current, the current density will not significantly shorten the EM lifetime. As such, the EM rule violation is considered as negligible and may thus be waived/ignored.

Figure 1:
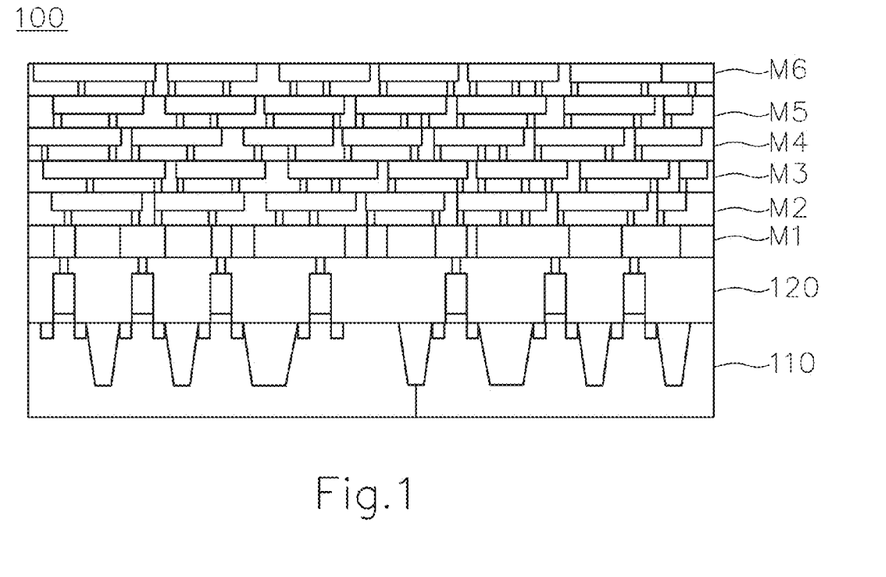
FIG. 1 is a schematic sectional view to illustrate an exemplary semiconductor device in accordance with various embodiments of the present disclosure.

FIG. 1 is a schematic sectional view to illustrate an exemplary semiconductor device 100 in accordance with various embodiments of the present disclosure. The semiconductor device 100, i.e., an IC, includes a substrate 110, a circuit 120, and a plurality of metal layers (M1-M6). The circuit 120 is disposed above the substrate 110, is configured to perform a function, e.g., a Boolean logic function, and includes a passive/active component, e.g., a resistor, a capacitor, an inductor, a transistor, a diode, or a combination thereof. The metal layers (M1-M6) are sequentially arranged above the circuit 120 from bottom to top and each include metal lines that interconnect components of the circuit 120. In some embodiments, the semiconductor device 100 further includes a metal layer (M0) between the substrate 110 and the metal layer (M1). In other embodiments, the semiconductor device 100 further includes one or more metal layers above the metal layer (M6).

Figure 2:
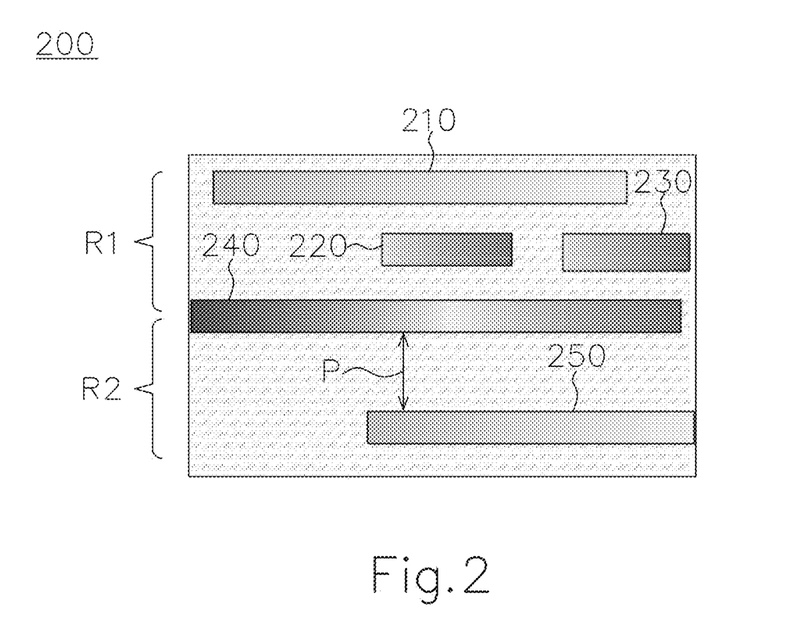
FIG. 2 is a schematic top view to illustrate an exemplary integrated circuit (IC) layout in accordance with various embodiments of the present disclosure.

FIG. 2 is a schematic top view to illustrate an exemplary IC layout 200 in accordance with various embodiments of the present disclosure. The IC layout 200 is in an electronic file format, such as a graphic database system (GDS) file format and includes a metal layer that corresponds to a metal layer, e.g., the metal layer (M6), of the semiconductor device 100. As illustrated in FIG. 2, the metal layer (M6) includes metal lines 210, 220, 230, 240, 250 and defines a metal pitch (P), i.e., the distance between an adjacent pair of the metal lines of the IC layout 200, e.g., the metal lines 240, 250. In this exemplary embodiment, the IC layout 200 is designed for fabricating a semiconductor device at 7 nm, i.e., N7, technology node. In an alternative embodiment, the IC layout 200 is designed for fabricating a semiconductor device at any technology node.

In some embodiments, the metal lines 210, 220, 230, 240, 250 correspond to metal lines of the semiconductor device 100 that are connected to a power source of the circuit 120. The power source is configured to provide a source voltage, e.g., a voltage at which the semiconductor device 100 operates, and a reference voltage, e.g., a ground voltage. In other embodiments, the metal lines 210, 220, 230, 240, 250 correspond to metal lines of the semiconductor device 100 that are connected to a signal source of the circuit 120. The signal source is configured to provide signals, e.g., clock signals or data signals.

Figure 3:
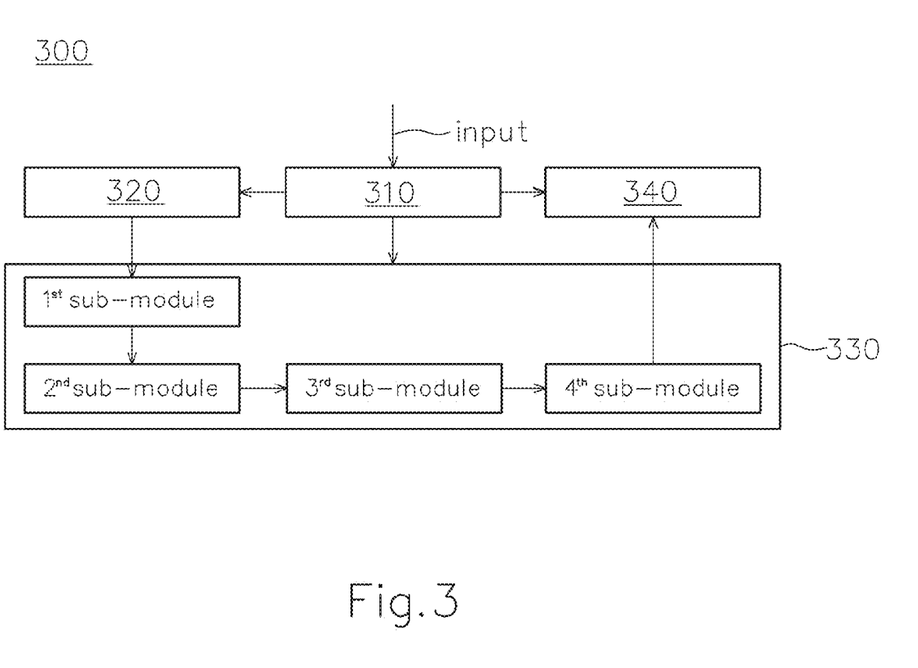
FIG. 3 is a block diagram to illustrate an exemplary system in accordance with various embodiments of the present disclosure.

FIG. 3 is a block diagram to illustrate an exemplary system 300 in accordance with various embodiments of the present disclosure. The system 300 is configured to determine whether an EM rule violation detected, e.g., by an EM analysis tool, in an IC layout, e.g., the IC layout 200, is negligible and includes a receiving module 310, a selecting module 320, a calculating module 330, and a determining module 340. As illustrated in FIG. 3, the receiving module 310 is configured to receive an input. In this exemplary embodiment, the input is in an electronic file format, e.g., an electronic text, and includes information associated with the IC layout 200, such as electrical and physical properties and temperatures.

In an embodiment, the receiving module 310 is configured to receive the input from the EM analysis tool. In such an embodiment, the EM analysis tool may be installed in the system 300 or in another system connected to the system 300, such as via a local area network (LAN) or the Internet. In another embodiment, the receiving module 310 is configured to receive the input from an input module (not shown) of the system 300 that includes, e.g., a computer keyboard and a data storage device interface. In such another embodiment, the input may be keyed-in via the computer keyboard or read from a data storage device, e.g., a USB data storage device, an optical disk, a hard disk, any data storage device, or a combination thereof, via the data storage device interface.

The selecting module 320 is connected to the receiving module 310 and is configured to select, from the input, a non EM rule compliant metal line of the IC layout 200, e.g., the metal line 240, that is in non compliance with, i.e., in an EM rule violation of, an EM rule, and a plurality of proximate metal lines of the IC layout 200 that are proximate to the non EM rule compliant metal line 240. In this exemplary embodiment, the proximate metal lines, e.g., the metal lines 210, 220, 230, 250, are in the same metal layer, i.e., the metal layer (M6), as the non EM rule compliant metal line 240. In some embodiments, at least one of the proximate metal lines is in a metal layer of the IC layout 200 different from the metal layer (M6), e.g., the metal layer (M5), or in a metal layer of the IC layout 200 above the metal layer (M6).

As illustrated in FIG. 2, the proximate metal lines 210, 220, 230, 250 are disposed in regions (R1, R2) of the metal layer (M6) that span, e.g., fifteen times the metal pitch (P), from opposite sides of the non EM rule compliant metal line 240, respectively.

Although the system 300 is exemplified such that the selecting module 320 thereof is configured to select the non EM rule compliant metal line 240 and the proximate metal lines 210, 220, 230, 250, it will be appreciated that, after reading this disclosure, the selecting module 320 may be configured in various ways so long as the selecting module 320 is configured to select at least one of the non EM rule compliant metal line 240 and the proximate metal lines 210, 220, 230, 250.

For example, in some embodiments, the selecting module 320 is configured to select either: the non EM rule compliant metal line 240; one of the proximate metal lines 210, 220, 230, 250; a metal line in the region (R1/R2) nearest/farthest to the non EM rule compliant metal line 240; a metal line in the region (R1/R2) that has the widest/narrowest width; a metal line in the region (R1/R2) that has the longest/shortest length; metal lines in the region (R1/R2); or the non EM rule compliant metal line 240 and the metal lines in the region (R1/R2).

Referring back to FIG. 3, the calculating module 330 is connected to the receiving module 310 and includes first, second, third, and fourth sub-modules. The first sub-module is connected to the selecting module 320 and is configured to obtain, from the input, an RMS current and a width of each of the non EM rule compliant metal line 240 and the proximate metal lines 210, 220, 230, 250 and to calculate a metal line temperature of each of the non EM rule compliant metal line 240 and the proximate metal lines 210, 220, 230, 250 based on the RMS current and the width thereof. In this exemplary embodiment, the first sub-module is configured to calculate a metal line temperature ($T_{ML}$) of a metal line using the equation, $$T_{ML} = I_{RMS}^2 (W + C_1)/(C_2 W^2) \quad \text{(EQ. 1)}$$

where $I_{RMS}$ is the RMS current of the metal line, W is the width of the metal line, and $C_1$ and $C_2$ are constants. By way of example, $C_1$ is between about 0.041 and about 0.045 and $C_2$ is between about 1.0E-6 and about 1.3E-6.

Although the system 300 is exemplified such that the first sub-module of the calculating module 330 thereof is configured to calculate the metal line temperature of each of the non EM rule compliant metal line 240 and the proximate metal lines 210, 220, 230, 250, it will be appreciated that, after reading this disclosure, the first sub-module may be configured in various ways so long as the first sub-module is configured to calculate the metal line temperature of at least one of the non EM rule compliant metal line 240 and the proximate metal lines 210, 220, 230, 250.

For example, in some embodiments, the first sub-module is configured to calculate either: a metal line temperature of the non EM rule compliant metal line 240; a metal line temperature of one of the proximate metal lines 210, 220, 230, 250; a metal line temperature of a metal line in the region (R1/R2) nearest/farthest to the non EM rule compliant metal line 240; a metal line temperature of a metal line in the region (R1/R2) that has the widest/narrowest width; a metal line temperature of a metal line in the region (R1/R2) that has the longest/shortest length; metal line temperatures of metal lines in the region (R1/R2); or metal line temperatures of the non EM rule compliant metal line 240 and the metal lines in the region (R1/R2).

The second sub-module is connected to the first sub-module and is configured to calculate a delta temperature based on the metal line temperatures. In this exemplary embodiment, the second sub-module is configured to calculate the delta temperature such that the delta temperature is equal to the highest metal line temperature.

Although the system 300 is exemplified such that the second sub-module of the calculating module 330 thereof is configured to calculate the delta temperature such that the delta temperature is equal to the highest metal line temperature, it will be appreciated that, after reading this disclosure, the second sub-module may be configured in various ways so long as the second sub-module is configured to calculate the delta temperature based on at least one of the metal line temperatures.

For example, in some embodiments, the second sub-module is configured to calculate the delta temperature such that the delta temperature is equal to either: the lowest metal line temperature; a randomly selected one of the metal line temperatures; the metal line temperature of the non EM rule compliant metal line 240; the metal line temperature of one of the proximate metal lines 210, 220, 230, 250; the metal line temperature of the metal line in the region (R1/R2) nearest/farthest to the non EM rule compliant metal line 240; the metal line temperature of the metal line in the region (R1/R2) that has the widest/narrowest width; the metal line temperature of the metal line in the region (R1/R2) that has the longest/shortest length; the average of the metal line temperatures; the average of the metal line temperatures of the metal lines in the region (R1/R2); the average of the metal line temperatures of the non EM rule compliant metal line 240 and the metal lines in the region (R1/R2); or the average of the highest metal line temperature and the lowest metal line temperature.

The third sub-module is connected to the second sub-module and is configured to obtain a device temperature from the input and to calculate a junction temperature based on the delta temperature and the device temperature. By way of example, the device temperature is a temperature at which the semiconductor device 100 operates, e.g., between about 85° C. and about 110° C. In this exemplary embodiment, the third sub-module is configured to calculate the junction temperature ($T_{junction}$) using the equation, $$T_{junction} = T_{device} + \Delta T \quad (EQ. 2)$$

where $T_{device}$ is the device temperature and $\Delta T$ is the delta temperature. As an example, $\Delta T$ is between about 5° C. and about 25° C. In such an example, $T_{junction}$ is between about 90° C. and about 135° C.

The fourth sub-module is connected to the third sub-module and is configured to obtain a width of the non EM rule compliant metal line 240 from the input and to calculate a threshold current based on the junction temperature ($T_{junction}$) and the width of the non EM rule compliant metal line 240. In this exemplary embodiment, the fourth sub-module is configured to calculate the threshold current ($I_{threshold}$) using the equation, $$I_{threshold} = T_{junction}(C_1 W + C_2) \quad (EQ. 3)$$

where W is the width of the non EM rule compliant metal line 240 and $C_1$ and $C_2$ are constants. By way of example, $C_1$ is about 1.0E-5 and $C_2$ is about 3.0E-5.

The determining module 340 is connected to the receiving module 310 and the fourth sub-module and is configured to obtain a direct current of the non EM rule compliant metal line 240 from the input, to compare the direct current of the non EM rule compliant metal line 240 with the threshold current ($I_{threshold}$), and to determine whether the EM rule violation is negligible based on the result of comparison. In this exemplary embodiment, when the result of comparison indicates that the direct current is less than the threshold current ($I_{threshold}$), the determining module 340 determines that the EM rule violation is negligible. As such, the IC layout 200 may proceed to tape-out and fabrication of a semiconductor device, e.g., the semiconductor device 100, from the IC layout 200 may be started/performed without delay. Otherwise, i.e., when the result of comparison indicates that the direct current is equal to or greater than the threshold current ($I_{threshold}$), the determining module 340 determines that the EM rule violation is not negligible. As such, the IC layout 200 has to be modified to fix the EM rule violation therein.

In this exemplary embodiment, the determining module 340 is further configured to generate an output, which includes information associated with the result of comparison.

Figure 4:
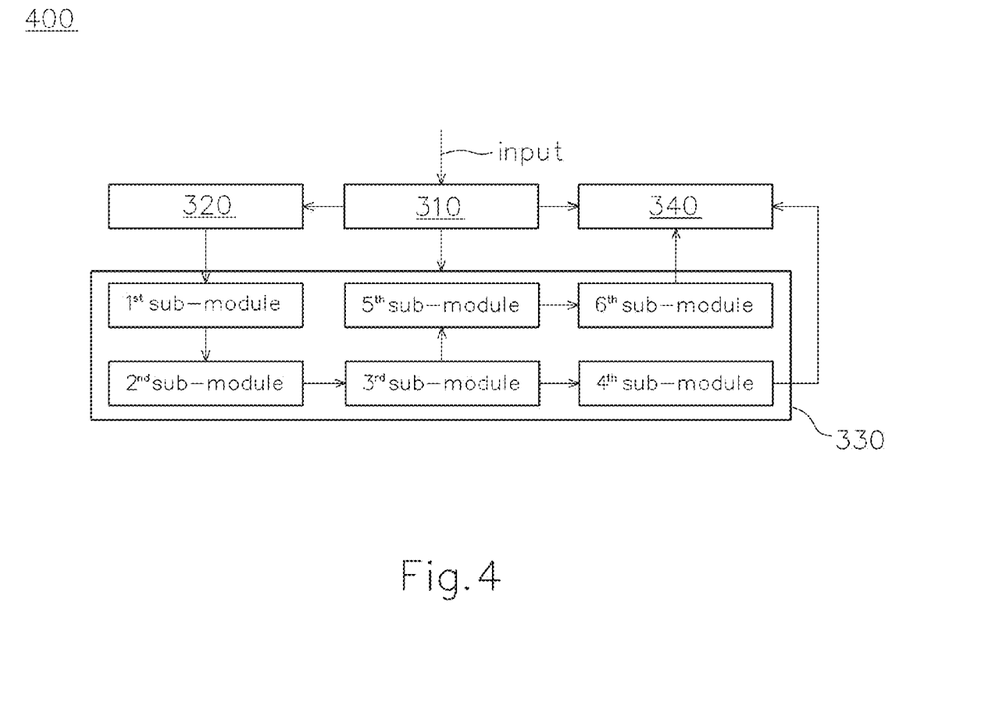
FIG. 4 is a block diagram to illustrate another exemplary system in accordance with various embodiments of the present disclosure.

FIG. 4 is a block diagram to illustrate another exemplary system 400 in accordance with various embodiments of the present disclosure. When compared to the previous embodiment, the calculating module 330 of the system 400 further includes fifth and sixth sub-modules. The fifth sub-module is connected to the third sub-module and is configured to obtain a reference resistance and a reference temperature from the input and to calculate a junction resistance based on the junction temperature ($T_{junction}$) and the reference resistance and the reference temperature. By way of example, the reference resistance/temperature is a resistance/temperature of the non EM rule compliant metal line 240. In this exemplary embodiment, the fifth sub-module is configured to calculate the junction resistance ($R_{junction}$) using the equation, $$R_{junction} = R_{reference}(1 + C_1(T_{junction} + T_{reference}) + C_2(T_{junction} + T_{reference})^2) \quad (EQ. 4)$$

where $R_{reference}$ is the reference resistance, $T_{reference}$ is the reference temperature, and $C_1$ and $C_2$ are constants. By way of example, $C_1$ is about 1.0E-5 and $C_2$ is about 3.0E-5.

The sixth sub-module is connected to the fifth sub-module and is configured to obtain a reference voltage from the input and to calculate a direct current of the non EM rule compliant metal line 240 based on the junction resistance ($R_{junction}$) and the reference voltage. By way of example, the reference voltage is a voltage of the non EM rule compliant metal line 240. In this exemplary embodiment, the sixth sub-module is configured to calculate the direct current ($I_{DC}$) using the equation, $$I_{DC} = V_{reference} / R_{junction} \quad (EQ. 5)$$

where $V_{reference}$ is the reference voltage.

The determining module 340 is connected to the fourth and sixth sub-modules and is configured to compare the direct current ($I_{DC}$) with the threshold current ($I_{threshold}$) and to determine whether the EM rule violation is negligible based on the result of comparison. In this exemplary embodiment, when the result of comparison indicates that the direct current ($I_{DC}$) is less than the threshold current ($I_{threshold}$), the determining module 340 determines that the EM rule violation is negligible. As such, the IC layout 200 may proceed to tape-out and fabrication of a semiconductor device, e.g., the semiconductor device 100, from the IC layout 200 may be started/performed without delay. Otherwise, i.e., when the result of comparison indicates that the direct current ($I_{DC}$) is equal to or greater than the threshold current ($I_{threshold}$), the determining module 340 determines that the EM rule violation is not negligible. As such, the IC layout 200 has to be modified to fix the EM rule violation therein.

Figure 5:
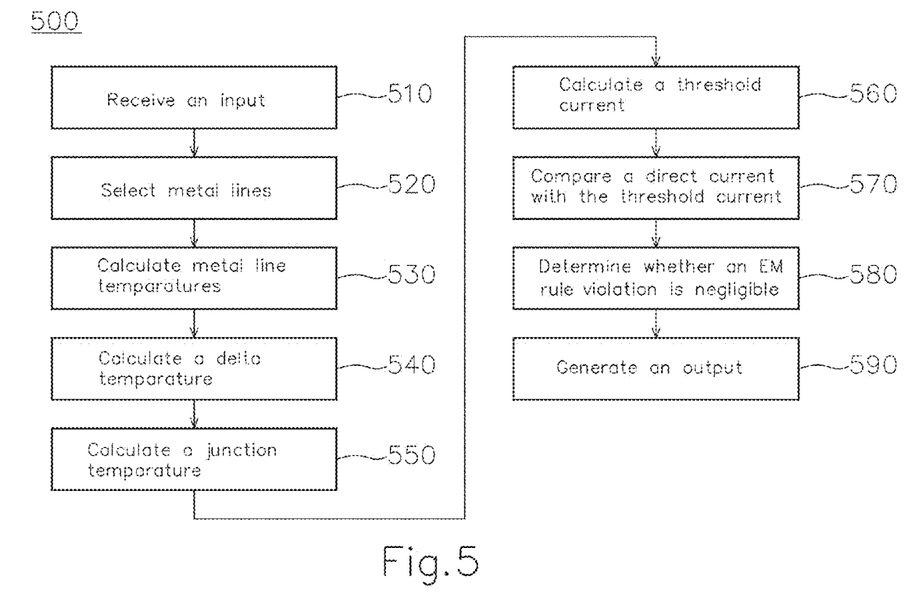
FIG. 5 is a flow chart to illustrate an exemplary method for analyzing an electromigration (EM) rule violation in accordance with various embodiments of the present disclosure.

FIG. 5 is a flow chart to illustrate an exemplary method 500 for analyzing an EM rule violation detected, e.g., by an EM analysis tool, in an IC layout, e.g., the IC layout 200, to be implemented using the system 300/400 in accordance with various embodiments of the present disclosure. While the method 500 is described in the context of the previously described embodiments for ease in understanding, it is understood that the method 500 is equally applicable to other structures as well.

In operation 510, the receiving module 310 receives an input. In this exemplary embodiment, the input is in an electronic file format, e.g., an electronic text file format, and includes information associated with the IC layout 200, such as electrical and physical properties and temperatures.

In operation 520, the selecting module 320 selects, from the input, a non EM rule compliant metal line of the IC layout 200, e.g., the metal line 240, that is in non compliance with, i.e., in an EM rule violation of, an EM rule, and a plurality of proximate metal lines of the IC layout 200 that are proximate to the non EM rule compliant metal line 240. In this exemplary embodiment, the proximate metal lines, e.g., the metal lines 210, 220, 230, 250, are in the same metal layer, i.e., the metal layer (M6), as the non EM rule compliant metal line 240. In some embodiments, at least one of the proximate metal lines is in a metal layer of the IC layout 200 different from the metal layer (M6), e.g., the metal layer (M5), or in a metal layer of the IC layout 200 above the metal layer (M6).

As illustrated in FIG. 2, the proximate metal lines 210, 220, 230, 250 are disposed in regions (R1, R2) of the metal layer (M6) that span, e.g., fifteen times the metal pitch (P), from opposite sides of the non EM rule compliant metal line 240, respectively.

Although operation 520 is exemplified such that the selecting module 320 selects the non EM rule compliant metal line 240 and the proximate metal lines 210, 220, 230, 250, it will be appreciated that, after reading this disclosure, operation 520 may be performed in various ways so long as the selecting module 320 selects at least one of the non EM rule compliant metal line 240 and the proximate metal lines 210, 220, 230, 250.

For example, in some embodiments, the selecting module 320 selects either: the non EM rule compliant metal line 240; one of the proximate metal lines 210, 220, 230, 250; a metal line in the region (R1/R2) nearest/farthest to the non EM rule compliant metal line 240; a metal line in the region (R1/R2) that has the widest/narrowest width; a metal line in the region (R1/R2) that has the longest/shortest length; metal lines in the region (R1/R2); or the non EM rule compliant metal line 240 and the metal lines in the region (R1/R2).

Referring back to FIG. 5, in operation 530, the calculating module 330 obtains, from the input, an RMS current and a width of each of the non EM rule compliant metal line 240 and the proximate metal lines 210, 220, 230, 250 and calculates a metal line temperature of each of the non EM rule compliant metal line 240 and the proximate metal lines 210, 220, 230, 250 based on the RMS current and the width thereof. In this exemplary embodiment, the calculating module 330 calculates a metal line temperature ($T_{ML}$) of a metal line using the equation EQ. 1.

Although operation 530 is exemplified such that the calculating module 330 calculates the metal line temperature of each of the non EM rule compliant metal line 240 and the proximate metal lines 210, 220, 230, 250, it will be appreciated that, after reading this disclosure, operation 530 may be performed in various ways so long as the calculating module 330 calculates the metal line temperature of at least one of the non EM rule compliant metal line 240 and the proximate metal lines 210, 220, 230, 250.

For example, in some embodiments, the calculating module 330 calculates either: a metal line temperature of the non EM rule compliant metal line 240; a metal line temperature of one of the proximate metal lines 210, 220, 230, 250; a metal line temperature of a metal line in the region (R1/R2) nearest/farthest to the non EM rule compliant metal line 240; a metal line temperature of a metal line in the region (R1/R2) that has the widest/narrowest width; a metal line temperature of a metal line in the region (R1/R2) that has the longest/shortest length; metal line temperatures of metal lines in the region (R1/R2); or metal line temperatures of the non EM rule compliant metal line 240 and the metal lines in the region (R1/R2).

In operation 540, the calculating module 330 calculates a delta temperature based on the metal line temperatures. In this exemplary embodiment, the calculating module 330 calculates the delta temperature such that the delta temperature is equal to the highest metal line temperature.

Although operation 540 is exemplified such that the calculating module 330 calculates the delta temperature such that the delta temperature is equal to the highest metal line temperature, it will be appreciated that, after reading this disclosure, operation 540 may be performed in various ways so long as the calculating module 330 calculates the delta temperature based on at least one of the metal line temperatures.

For example, in some embodiments, the calculating module 330 calculates the delta temperature such that the delta temperature is equal to either: the lowest metal line temperature; a randomly selected one of the metal line temperatures; the metal line temperature of the non EM rule compliant metal line 240; the metal line temperature of one of the proximate metal lines 210, 220, 230, 250; the metal line temperature of the metal line in the region (R1/R2) nearest/farthest to the non EM rule compliant metal line 240; the metal line temperature of the metal line in the region (R1/R2) that has the widest/narrowest width; the metal line temperature of the metal line in the region (R1/R2) that has the longest/shortest length; the average of the metal line temperatures; the average of the metal line temperatures of the metal lines in the region (R1/R2); the average of the metal line temperatures of the non EM rule compliant metal line 240 and the metal lines in the region (R1/R2); or the average of the highest metal line temperature and the lowest metal line temperature.

In operation 550, the calculating module 330 obtains a device temperature from the input and calculates a junction temperature based on the delta temperature and the device temperature. By way of example, the device temperature is a temperature at which the semiconductor device 100 operates, e.g., between about 85° C. and about 110° C. In this exemplary embodiment, the calculating module 330 calculates the junction temperature using the equation EQ. 2.

In operation 560, the calculating module 330 obtains a width of the non EM rule compliant metal line 240 from the input and calculates a threshold current based on the junction temperature and the width of the non EM rule compliant metal line 240. In this exemplary embodiment, the calculating module 330 calculates the threshold current using the equation EQ. 3.

In operation 570, the determining module 340 compares a direct current of the non EM rule compliant metal line 240 with the threshold current. In this exemplary embodiment, operation 570 includes an operation in which the determining module 340 obtains the direct current of the non EM rule compliant metal line 240 from the input.

Figure 6:
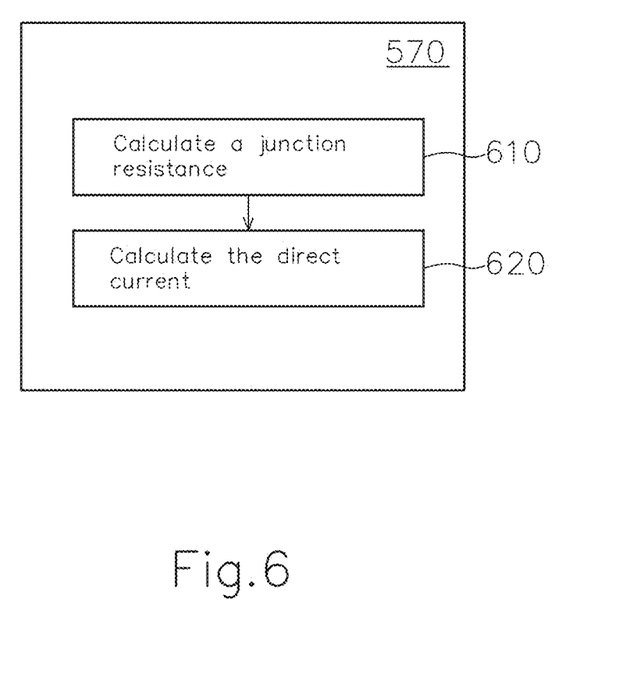
FIG. 6 is a flow chart to illustrate an operation of the method of FIG. 5 in accordance with various embodiments of the present disclosure.

FIG. 6 is a flow chart to illustrate operation 570 of the method 500 in accordance with various embodiments of the present disclosure. In an alternative embodiment, as illustrated in FIG. 6, operation 570 includes operations 610, 620. In operation 610, the calculating module 330 obtains a reference resistance and a reference temperature from the input and calculates a junction resistance based on the junction temperature and the reference resistance and the reference temperature. By way of example, the reference resistance/temperature is a resistance/temperature of the non EM rule compliant metal line 240. In this exemplary embodiment, the calculating module 330 calculates the junction resistance using the equation EQ. 4.

In operation 620, the calculating module 330 obtains a reference voltage from the input and calculates the direct current of the non EM rule compliant metal line 240 based on the junction resistance and the reference voltage. By way of example, the reference voltage is a voltage of the non EM rule compliant metal line 240. In this exemplary embodiment, the calculating module 330 calculates the direct current ($I_{DC}$) using the equation EQ. 5.

Referring back to FIG. 5, in operation 580, the determining module 340 compares the direct current with the threshold current and determines whether the EM rule violation is negligible based on the result of comparison. In this exemplary embodiment, when the result of comparison indicates that the direct current is less than the threshold current, the determining module 340 determines that the EM rule violation is negligible. As such, the IC layout 200 may proceed to tape-out and fabrication of a semiconductor device 100 from the IC layout 200 may be started/performed without delay. Otherwise, i.e., when the result of comparison indicates that the direct current is either equal to or greater than the threshold current, the determining module 340 determines that the EM rule violation is not negligible. As such, the IC layout 200 has to be modified to fix the EM rule violation therein.

In operation 590, the determining module 340 generates an output, which includes information associated with the result of comparison.

It should be understood that one or more of the operations of the method 500 may be removed, that one or more operations may be added to the method 500, and that the operations of the method 500 may performed in any order.

In some embodiments, the method 500 are in the form of program instructions stored in a non-transitory storage medium, which when executed by a controller, cause the system 300/400 to perform the operations described above. Examples of the non-transitory storage medium include, but are not limited to, an optical disk, a hard disk, a USB data storage device, any non-transitory storage medium, and a combination thereof.

In an exemplary embodiment, a method comprises receiving an input that is in an electronic file format and that includes information associated with an integrated circuit (IC) layout, selecting a non EM rule compliant metal line of the IC layout that is in violation of an EM rule from the input, obtaining a current of the non EM rule compliant metal line from the input, comparing the current with a threshold current, and determining whether the EM rule violation is negligible based on the result of comparison.

In another exemplary embodiment, a method comprises receiving an input that is in an electronic file format and that includes information associated with an integrated circuit (IC) layout, selecting a non EM rule compliant metal line of the IC layout that is in violation of an EM rule from the input, obtaining a reference value of the IC layout from the input, calculating a current of the non EM rule compliant metal line based on the reference value, comparing the current with a threshold current, and determining whether the EM rule violation is negligible based on the result of comparison.

In another exemplary embodiment, a method for manufacturing a semiconductor device comprises receiving an input that is in an electronic file format and that includes information associated with an integrated circuit (IC) layout, selecting a non EM rule compliant metal line of the IC layout that is in violation of an EM rule from the input, determining whether the EM rule violation is negligible based on the result of comparison, and when it is determined that the EM rule violation is negligible, fabricating a semiconductor device from the IC layout.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
    receiving an input that is in an electronic file format and that includes information associated with an integrated circuit (IC) layout;
    selecting a non electromigration (EM) rule compliant metal line of the IC layout from the input, the non EM rule compliant metal line being in violation of an EM rule;
    selecting a proximate metal line of the IC layout from the input, the proximate metal line being disposed in a region of the IC layout that spans from a side of the non EM rule compliant metal line;
    obtaining a current of the non EM rule compliant metal line from the input;
    comparing the current with a threshold current;
    determining whether the EM rule violation is negligible based on the result of the comparison; and
    based on a determination that the EM rule violation is negligible, fabricating a semiconductor device from the IC layout;
    wherein at least one of the operations of the method are performed using a computer.

2. The method of claim 1, further comprising calculating a metal line temperature of at least one of the non EM rule compliant metal line and the proximate metal line.

3. The method of claim 2, wherein calculating the metal line temperature includes obtaining a root-mean-square (RMS) current of the at least one of the non EM rule compliant metal line and the proximate metal line from the input and calculating the metal line temperature based on the RMS current.

4. The method of claim 2, wherein calculating the meal line temperature includes obtaining a width of the at least one of the non EM rule compliant metal line and the proximate metal line from the input and calculating the metal line temperature based on the width.

5. The method of claim 2, further comprising calculating a delta temperature based on the metal line temperature.

6. The method of claim 5, further comprising:
    obtaining a device temperature of the IC layout from the input; and
    calculating a junction temperature based on the delta temperature and the device temperature.

7. The method of claim 6, further comprising:
    obtaining a width of the non EM rule compliant metal line from the input; and calculating the threshold current based on the junction temperature and the width.

8. A method comprising:

receiving an input that is in an electronic file formal and that includes information associated with an integrated circuit (IC) layout;

selecting a non electromigration (EM) rule compliant metal line of the IC layout from the input, the non EM rule compliant metal line being in violation of an EM rule;

selecting a proximate metal line of the IC layout from the input, the proximate metal line being disposed in a region of the IC layout that spans from a side of the non EM rule compliant metal line;

obtaining a reference value of the IC layout from the input;

calculating a current of the non EM rule compliant metal line based on the reference value;

comparing the current with a threshold current;

determining whether the EM rule violation is negligible based on the result of the comparison; and based on a determination that the EM rule violation is negligible, fabricating a semiconductor device from the IC layout;

wherein at least one of the operations of the method are performed using a computer.

9. The method of claim 8, further comprising calculating a metal line temperature of at least one of the non EM rule compliant metal line and the proximate metal line.

10. The method of claim 9, wherein calculating the metal line temperature includes obtaining a root-mean-square (RMS) current of the at least one of the non EM rule compliant metal line and the proximate metal line from the input and calculating the metal line temperature based on the RMS current.

11. The method of claim 9, wherein calculating the metal line temperature includes obtaining a width of the at least one of the non EM rule compliant metal line and the proximate metal line from the input and calculating the metal line temperature based on the width.

12. The method of claim 9, further comprising calculating a delta temperature based on the metal line temperature.

13. The method of claim 12, further comprising:
obtaining a device temperature of the IC layout from the input; and
calculating a junction temperature based on the delta temperature and the device temperature.

14. The method of claim 13, further comprising:
obtaining a width of the non EM rule compliant metal line from the input; and
calculating the threshold current based on the junction temperature and the width.

15. The method of claim 13, further comprising calculating the current based further on the junction temperature.

16. A method for manufacturing a semiconductor device, the method comprising:

receiving an input that is in an electronic file format and that includes information associated with an integrated circuit (IC) layout;

selecting a non EM rule compliant metal line of the IC layout from the input, the non EM rule compliant metal line being in violation of an EM rule;

selecting a proximate metal line of the IC layout from the input, the proximate metal line being disposed in a region of the IC layout that spans from a side of the non EM rule compliant metal line;

determining whether the EM rule violation is negligible based on the result of the comparison; and based on a determination that the EM rule violation is negligible, fabricating the semiconductor device from the IC layout;

wherein at least one of the operations of the method are performed using a computer.

17. The method of claim 16, further comprising calculating a metal line temperature of at least one of the non EM rule compliant metal line and the proximate metal line.

* * * * *